(12) United States Patent
Hollmann et al.

(10) Patent No.: US 12,126,835 B2
(45) Date of Patent: Oct. 22, 2024

(54) METHOD AND APPARATUS FOR NON-SEPARABLE TRANSFORM SELECTION IN AN ENCODER AND DECODER

(71) Applicant: Telefonaktiebolaget LM Ericsson (publ), Stockholm (SE)

(72) Inventors: Christopher Hollmann, Uppsala (SE); Davood Saffar, Solna (SE); Per Wennersten, Årsta (SE); Jacob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 343 days.

(21) Appl. No.: 17/621,059

(22) PCT Filed: Jun. 15, 2020

(86) PCT No.: PCT/EP2020/066508
§ 371 (c)(1),
(2) Date: Dec. 20, 2021

(87) PCT Pub. No.: WO2020/254256
PCT Pub. Date: Dec. 24, 2020

(65) Prior Publication Data
US 2022/0337877 A1    Oct. 20, 2022

Related U.S. Application Data

(60) Provisional application No. 62/864,601, filed on Jun. 21, 2019.

(51) Int. Cl.
*H04N 19/70* (2014.01)
*H04N 19/12* (2014.01)
(Continued)

(52) U.S. Cl.
CPC .......... *H04N 19/70* (2014.11); *H04N 19/12* (2014.11); *H04N 19/172* (2014.11);
(Continued)

(58) Field of Classification Search
CPC ...... H04N 19/70; H04N 19/12; H04N 19/172; H04N 19/176; H04N 19/1883; H04N 19/60
See application file for complete search history.

(56) References Cited

U.S. PATENT DOCUMENTS

| | | | | |
|---|---|---|---|---|
| 2018/0367814 A1* | 12/2018 | Seregin | ............... | H04N 19/117 |
| 2022/0030278 A1* | 1/2022 | Egilmez | ............... | H04N 19/176 |
| 2022/0312040 A1* | 9/2022 | Naser | .................... | H04N 19/12 |

OTHER PUBLICATIONS

International Search Report and Written Opinion of the International Searching Authority, PCT/EP2020/066508, mailed Aug. 6, 2020, 16 pages.
(Continued)

*Primary Examiner* — Fabio S Lima
(74) *Attorney, Agent, or Firm* — Sage Patent Group (57) ABSTRACT

A method, decoder apparatus, and computer programs are provided. A bit stream having a video block encoded with a multiple transform selection (MTS) index is received. The MTS index is parsed to determine a value of it. Responsive to the MTS index value being a predetermined value (or one of a predetermined set of indices), a LFNST index is parsed from the bit stream to determine a value of it, the value providing an indication whether a LFNST transform set is to be used in decoding the video block. Responsive to the MTS index value not being the predetermined value (or one of the set of indices), the value of the LFNST index is set to a default value indicating no LFNST transform is to be used in the decoding. The video block is decoded based on the values of the MTS index and the LFNST index.

11 Claims, 5 Drawing Sheets

(51) Int. Cl.
*H04N 19/169* (2014.01)
*H04N 19/172* (2014.01)
*H04N 19/176* (2014.01)
*H04N 19/60* (2014.01)

(52) U.S. Cl.
CPC ....... *H04N 19/176* (2014.11); *H04N 19/1883* (2014.11); *H04N 19/60* (2014.11)

(56) References Cited

OTHER PUBLICATIONS

Chiang, M., et al., "CE6-related: Simplifications for LFNST," Joint Video Experts Team (JVET) of ITU-T SG 16 WP3 and ISO/IEC JTC 1/SC 29/WG 11, 15$^{th}$ Meeting: Gothenburg, SE, Jul. 3-12, 2019, MediaTek Inc., JVET-O0292-v1 (XP030219133), 6 pages.

Egilmez, H., et al., "Non-CE6: An MTS-based Restriction for LFNST beyond Transform Skip," Joint Video Experts Team (JVET) of ITU-T SG 16 WP3 and ISO/IEC JTC 1/SC 29/WG 11, 15th Meeting: Gothenburg, SE, Jul. 3-12, 2019, Qualcomm Incorporated, JVET-O0368-v1 (XP030222085), 4 pages.

Le Léannec, F., et al., "Non-CE6: Interaction between MTS and LFNST," Joint Video Experts Team (JVET) of ITU-T SG 16 WP3 and ISO/IEC JTC 1/SC 29/WG 11, 15th Meeting: Gothenburg, SE, Jul. 3-12, 2019, InterDigital Communications, Inc., JVET-O0466 (XP030219653), 8 pages.

Zhao, X., et al., "CE6: Coupled Primary and Secondary Transform (Test 6.3.2)" Joint Video Experts Team (JVET) of ITU-T SG 16 WP3 and ISO/IEC JTC 1/SC 29/WG 11, 12th Meeting: Macao, CN, Oct. 3-12, 2018, Tencent, JVET-L0288-r1 (XP030265376), 4 pages.

Koo, M., et al., "Video Coding Technology Proposal by LG Electronics," Joint Video Experts Team (JVET) of ITU-T SG 16 WP3 and ISO/IEC JTC 1/SC 29/WG 11, 10th Meeting: San Diego, CA, USA Apr. 10-20, 2018, LG Electronics, LG Electronics, JVET-J0017, 20 pages. (XP030248124).

Koo, M., et al., "Description of SDR video coding technology proposal by LG Electronics" Joint Video Experts Team (JVET) of ITU-T SG 16 WP3 and ISO/IEC JTC 1/SC 29/WG 11, 10th Meeting: San Diego, CA, USA Apr. 10-20, 2018, LG Electronics, JVET-J0017-v1 (XP030248124), 71 pages.

Koo, M., et al., "Description of SDR video coding technology proposal by LG Electronics" Joint Video Experts Team (JVET) of ITU-T SG 16 WP3 and ISO/IEC JTC 1/SC 29/WG 11, 10th Meeting: San Diego, CA, USA Apr. 10-20, 2018, LG Electronics, JVET-J0017-SDR (XP030248124), 1,331 pages.

* cited by examiner

METHOD AND APPARATUS FOR NON-SEPARABLE TRANSFORM SELECTION IN AN ENCODER AND DECODER

CROSS REFERENCE TO RELATED APPLICATIONS

This application is a 35 U.S.C. § 371 national stage application of PCT International Application No. PCT/EP2020/066508 filed on Jun. 15, 2020, which in turn claims domestic priority to U.S. Provisional Patent Application No. 62/864,601, filed on Jun. 21, 2019, the disclosures and content of which are incorporated by reference herein in their entirety

TECHNICAL FIELD

The application relates to methods and apparatuses for transform selection in encoding and decoding.

BACKGROUND

The current test model VTM of the video codec under standardization Versatile Video Coding (VVC) includes a tool called Multiple Transform Selection (MTS). This tool allows an encoder to choose between three different transforms. These transforms consist of two variants of a Discrete Cosine Transformation (DCT) and one variant of a Discrete Sine Transformation (DST). During encoding, a transform is typically performed in the horizontal direction of the block, followed by a second transform in the vertical direction. These two transforms are independent of each other, so it is very much possible to use different transforms in different directions. The set of transforms that can be selected from includes DCT-2, DST-7 and DCT-8.

The encoder tests all allowed combinations when selecting a transform to use. These are dependent on block type (inter/intra), block size, channel type and prediction mode. For example, for blocks using intra prediction, meaning surrounding samples are used to predict the current block, the encoder searches up to five possible five different combinations of primary transforms. These five different possible combinations are:

1. DCT-2 horizontal and DCT-2 vertical (which is also the default if encoding of a block is not allowed to use MTS (e.g., due to size constraints or if MTS is not used at all)
2. DST-7 horizontal and DST-7 vertical
3. DST-7 horizontal and DCT-8 vertical
4. DCT-8 horizontal and DST-7 vertical
5. DCT-8 horizontal and DCT-8 vertical Furthermore, the codec contains non-separable secondary transforms, which can be applied to the transform coefficients produced by the first separable transform. A tool known as the Low Frequency Non-Separable Transform (LFNST) may be used to select a non-separable secondary transform when a non-separable secondary transform can be used. The LFNST tool contains four sets of two transforms each. For each block, one set is available. The available set is selected based on the direction of the intra prediction, as illustrated in Table 1 [see 1—M. Koo, J. Lim, M. Salehifar, S. H. Kim. CE6: Reduced Secondary Transform (RST) (CE6-3.1), JVET-N0193, Geneva, March 2019].

TABLE 1

| LFNST set selection | |
| --- | --- |
| IntraPredMode | Tr. set index |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

An encoder can select and send different combinations of MTS and LFNST. A list of possible MTS and LFNST combinations are illustrated in Table 2.

TABLE 2

| List of possible MTS and LFNST combinations | | | | | |
| --- | --- | --- | --- | --- | --- |
| MTS | LFNST | MTS index | Binarization of MTS | LFNST index | Binarization of LFNST |
| (DCT-2, DCT-2) | None | 0 | 0 | 0 | 0 |
| (DCT-2, DCT-2) | Transform 1 of current set | 0 | 0 | 1 | 10 |
| (DCT-2, DCT-2) | Transform 2 of current set | 0 | 0 | 2 | 11 |
| (DST-7, DST-7) | None | 1 | 10 | 0 | 0 |
| (DST-7, DST-7) | Transform 1 of current set | 1 | 10 | 1 | 10 |
| (DST-7, DST-7) | Transform 2 of current set | 1 | 10 | 2 | 11 |
| (DCT-8, DST-7) | None | 2 | 110 | 0 | 0 |
| (DCT-8, DST-7) | Transform 1 of current set | 2 | 110 | 1 | 10 |
| (DCT-8, DST-7) | Transform 2 of current set | 2 | 110 | 2 | 11 |
| (DST-7, DCT-8) | None | 3 | 1110 | 0 | 0 |
| (DST-7, DCT-8) | Transform 1 of current set | 3 | 1110 | 1 | 10 |
| (DST-7, DCT-8) | Transform 2 of current set | 3 | 1110 | 2 | 11 |
| (DCT-8, DCT-8) | None | 4 | 1111 | 0 | 0 |
| (DCT-8, DCT-8) | Transform 1 of current set | 4 | 1111 | 1 | 10 |
| (DCT-8, DCT-8) | Transform 2 of current set | 4 | 1111 | 2 | 11 |

While an encoder does not necessarily search all possible combinations (e.g., the reference encoder does not), a decoder has to be able to parse and apply all possible combinations.

The encoder may spend quite a bit of time testing and evaluating combinations which are very unlikely to be chosen. The encoder also spends bits to signal that it is not using these combinations.

SUMMARY

According to some embodiments of inventive concepts, a method may be provided in a decoder to receive a bit stream having an encoded video block encoded with a multiple transform selection (MTS) index. The method may further include parsing the MTS index to determine a value of the MTS index. The method may further include responsive to the value of the MTS index being a predetermined value: parsing a low frequency non-separable transform, LFNST, index from the bit stream to determine a value of the LFNST index, the value of the LFNST index providing an indication whether a LFNST transform set is to be used in decoding the encoded video block. The method may further include responsive to the value of the MTS index not being the predetermined value: setting the value of the LFNST index to a default value indicating no LFNST transform is to be used in decoding the encoded video block. The method may further include decoding the encoded video block based on the value of the MTS index and the value of the LFNST index.

The advantages provided by the inventive concepts include reducing the encoder complexity by removing combinations of MTS and LFNST combinations described above. The number of bits spent on signaling the selected MTS and LFNST modes may be reduced as well as reducing the time the encoder needs to evaluate these combinations. Both encoder and decoder complexity are reduced by using a less complex transform table for certain block sizes. Furthermore, the efficiency of the binarization is increased as the number of sets of two transforms each is reduced from 4 to 1.

According to some embodiments of inventive concepts, a method may be provided in a decoder to receive a bit stream having an encoded video block encoded with a multiple transform selection (MTS) index. The method may further include parsing the MTS index to determine a value of the MTS index. The method further includes determining whether the value is one of a predetermined set of indices. The method further includes responsive to the value being one of the predetermined set of indices: parsing a low frequency non-separable transform, LFNST, index from the bit stream to determine a value of the LFNST index, the value indicating whether a LFNST transform set is to be used in decoding the encoded video block. The method further includes responsive to the value not being one of the predetermined set of indices: setting the value of the LFNST index to a default value indicating no LFNST transform is to be used in decoding the encoded video block; and decoding the encoded video block based on the value of the MTS index and the value of the LFNST index.

According to some embodiments of inventive concepts, a method may be provided in an encoder to encode a value of a multiple transform selection, MTS, index for a video block being encoded for transmission to a decoder via a bit stream. The method further includes based on the value of the MTS index being a predetermined value, determining whether a low frequency non-separable transform, LFNST, index should be encoded into the bit stream. The method further includes responsive to determining that the LFNST index should be encoded into the bitstream: encoding the video block into the bitstream with the value of the MTS index and a value of the LFNST index, the value of the LFNST index based on the value of the MTS index. The method further includes responsive to determining that the LFNST index should not be encoded into the bit stream: encoding the video block into the bitstream with the value of the MTS index without encoding a value of the LFNST index into the bit stream. The method further includes based on the value of the MTS index not being a predetermined value: encoding the video block into the bitstream with the value of the MTS index without encoding a value of the LFNST index into the bit stream.

According to some embodiments of inventive concepts, a method may be provided in an encoder to encode a value of a multiple transform selection, MTS, index for a video block being encoded for transmission to a decoder via a bit stream, the value identifying a set of indices. The method further includes responsive to the set of indices being one of a predetermined set of indices: encoding the video block and the value of the MTS index into the bit stream and encoding a value of a low frequency non-separable transform, LFNST, index into the bit stream, the value of the LFNST index based on the value of the MTS index. The method further includes responsive to the set of indices not being one of a predetermined set of indices: encoding the video block and the value of the MTS index into the bit stream without encoding a value of the LFNST index into the bit stream.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
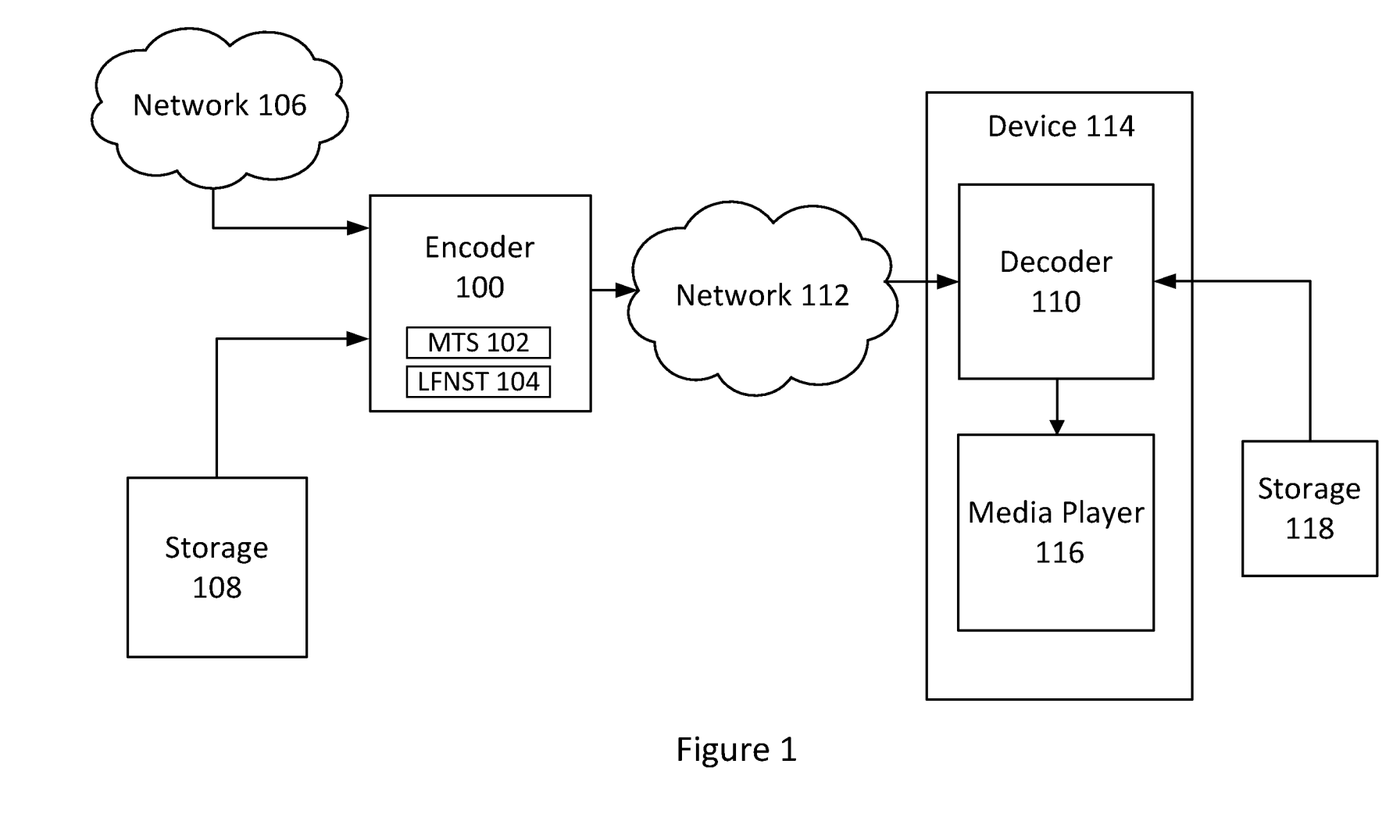
FIG. 1 is a block diagram illustrating an example of an environment of a system in which the encoder and decoder may be implemented according to some embodiments.

FIG. 1 illustrates an example of an operating environment of an encoder 100 that may be used to encode bit streams as described herein. The encoder 100 has a multiple transform selection (MTS) component 102 and a low frequency non-separable transform (LFNST) component 104 used in encoding. The encoder 100 receives video from network 106 and/or from storage 108 and encodes the video into bit-streams using MTS component 102 and LFNST component 104 as described below and transmits the encoded video to decoder 110 via network 112. Storage device 108 may be part of a storage depository of videos such as a storage repository of a store or a streaming video service, a separate storage component, a component of a mobile device, etc.

The decoder 110 may be part of a device 114 having an audio/video (A/V) media player 116. The device 114 may be a mobile device, a set-top device, a desktop computer, and the like. The decoder 110 may receive encoded bit streams via network 112 and/or via storage 118. Storage 118 may store encoded videos received via network 112 or other networks and devices for playback at a later time. While shown as a separate device, storage 118 may be part of the device 114 or be a separate device.

Figure 2:
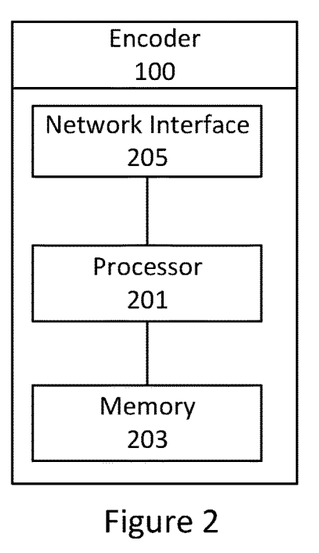
FIG. 2 is a block diagram is a block diagram illustrating an encoder according to some embodiments.

FIG. 2 is a block diagram illustrating elements of encoder 100 configured to encode video frames according to some embodiments of inventive concepts. As shown, encoder 100 may include a network interface circuit 205 (also referred to as a network interface) configured to provide communications with other devices/entities/functions/etc. The encoder 100 may also include a processor circuit 201 (also referred to as a processor) coupled to the network interface circuit 205, and a memory circuit 203 (also referred to as memory) coupled to the processor circuit. The memory circuit 203 may include computer readable program code that when executed by the processor circuit 201 causes the processor circuit to perform operations according to embodiments disclosed herein.

According to other embodiments, processor circuit 201 may be defined to include memory so that a separate memory circuit is not required. As discussed herein, operations of the encoder 100 may be performed by processor 201 and/or network interface 205. For example, processor 201 may control network interface 205 to transmit communications to decoder 110 and/or to receive communications through network interface 106 from one or more other network nodes/entities/servers such as other encoder nodes, depository servers, etc. Moreover, modules may be stored in memory 203, and these modules may provide instructions so that when instructions of a module are executed by processor 201, processor 201 performs respective operations.

Figure 3:
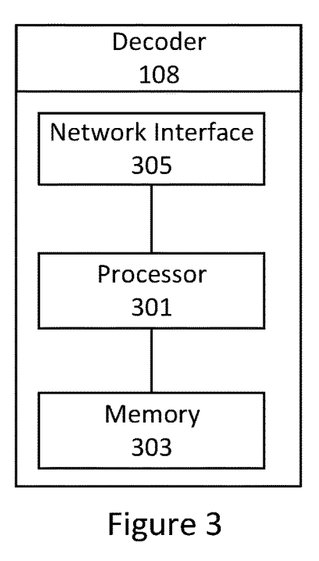
FIG. 3 is a block diagram illustrating a decoder according to some embodiments.

FIG. 3 is a block diagram illustrating elements of decoder 110 configured to decode video frames according to some embodiments of inventive concepts. As shown, decoder 110 may include a network interface circuit 305 (also referred to as a network interface) configured to provide communications with other devices/entities/functions/etc. The decoder 110 may also include a processor circuit 301 (also referred to as a processor) coupled to the network interface circuit 305, and a memory circuit 303 (also referred to as memory) coupled to the processor circuit. The memory circuit 303 may include computer readable program code that when executed by the processor circuit 301 causes the processor circuit to perform operations according to embodiments disclosed herein.

According to other embodiments, processor circuit 301 may be defined to include memory so that a separate memory circuit is not required. As discussed herein, operations of the decoder 110 may be performed by processor 301 and/or network interface 305. For example, processor 301 may control network interface 305 to receive communications from encoder 100. Moreover, modules may be stored in memory 303, and these modules may provide instructions so that when instructions of a module are executed by processor 301, processor 301 performs respective operations.

A potential advantage provided by the inventive concepts described herein include reducing the encoder run time by limiting the number of MTS and LFNST transform combinations that may be evaluated in the case of an encoder implemented in software. In the case of an encoder implemented in hardware, the complexity reduction may take another form, such as lowered silicon area usage instead of encoder run time.

The embodiments described herein may reduce the complexity of both the encoder and decoder by reducing the number of bits spent on signaling the selected MTS and LFNST modes and may reduce the time an encoder needs to evaluate these combinations.

A further improvement is a reduction in memory usage as no transform coefficients for three sets of LFNST transforms have to be stored in the memory. In a hardware implementation this may translate to a smaller silicon surface area.

In one embodiment of inventive concepts, the LFNST can only be applied when a block is encoded using the combination (DCT-2, DCT-2) as the primary transform. This means that the encoder does not need to evaluate combinations of DST-7, DCT-8 and LFNST. This embodiment may reduce the run time since many combinations can be skipped from being evaluated. Also, there is no need to encode the LFNST index if a block uses an MTS combination with DST-7 or DCT-8 as in these cases the LFNST index will always be 0.

For the decoder, when a block is encoded using an MTS combination with DST-7 or DCT-8, the decoder can infer that the LFNST index for the current block is 0 and set the value of the LFNST index to 0. Therefore, there is no need to decode the LFNST index at the decoder when the block is encoded using an MTS combination with DST-7 or DCT-8.

The following combinations listed in Table 3 may be allowed in this embodiment.

TABLE 3

List of allowed MTS and LFNST combinations in the inventive concepts

| MTS | LFNST | MTS index | Binarization of MTS index | LFNST index | Binarization of LFNST index |
|---|---|---|---|---|---|
| (DCT-2, DCT-2) | None | 0 | 0 | 0 | 0 |
| (DCT-2, DCT-2) | Transform 1 of current set | 0 | 0 | 1 | 10 |
| (DCT-2, DCT-2) | Transform 2 of current set | 0 | 0 | 2 | 11 |
| (DST-7, DST-7) | None | 1 | 10 | — | — |
| (DCT-8, DST-7) | None | 2 | 110 | — | — |
| (DST-7, DCT-8) | None | 3 | 1110 | — | — |
| (DCT-8, DCT-8) | None | 4 | 1111 | — | — |

Test Results Based on Using the Inventive Concepts of Table 2.

The Joint Video Experts Team (JVET) which develops the VVC standard uses a predefined set of test sequences and configurations. These test sequences and configurations are referred to as the Common Test Conditions (CTC). Almost every contribution that proposes changes to the encoder and/or decoder needs to provide results based on these CTC to be able to compare the impact on the compression efficiency to other proposals. The CTC contain different configurations to mimic different real-world applications.

A test according to the All Intra configuration of the CTC showed a loss of 0.08% in compression efficiency. Here, the encoder run time was reduced to 93% of the reference encoder run time.

Using the Random Access configuration of the CTC, a first test showed a loss of 0.09% in compression efficiency. The encoder run time was reduced to 97% compared to a reference encoding.

In the description that follows, an encoder and decoder configured to perform in accordance with portions of the VVC standardization is used to describe the inventive concepts. Other standardizations may be implemented using the concepts described herein.

The below embodiments describe overall operation from the decoder perspective. Flowcharts illustrated in FIGS. 4 and 5 will be used in describing these embodiments.

Figure 4:
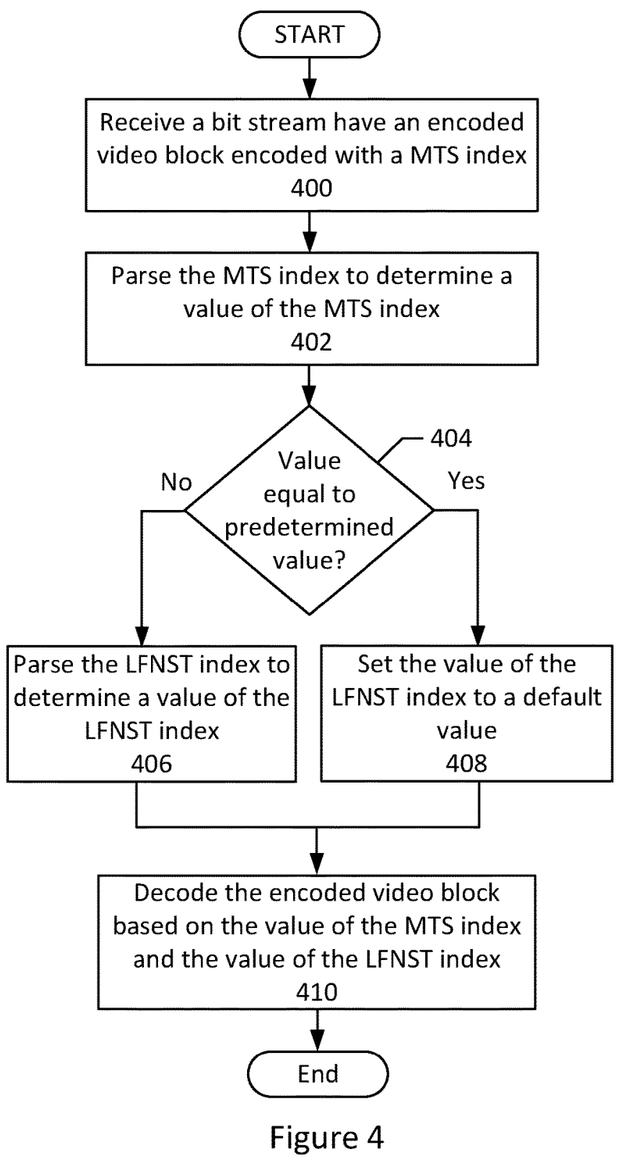
FIGS. 4-5 are flow charts illustrating operations of a decoder in accordance with some embodiments of inventive concepts.

Turning to FIG. 4, in a first embodiment, in operation 400, the processing circuitry 301 of the decoder 110 may receive, via network interface 305, a bitstream having an encoded video block encoded with a multiple transform selection (MTS) index. In operation 402, the processing circuitry 301 may parse the MTS index to determine a value of the MTS index. The value of the MTS index may identify a set of indices.

In operation 404, the processing circuitry 301 may determine if the value of the MTS index is equal to a predetermined value. In one embodiment, the predetermined value is a value of zero. The predetermined value may identify a predetermined set of indices Based on the determined value of the MTX index, the processing circuitry 301 may decide whether or not to infer the LFNST index.

In operation 406, responsive to the value of the MTS index being the predetermined value, the processing circuitry 301 of the decoder 110 may parse the LFNST index from the bit stream to determine a value of the LFNST index, the value of the LFNST index providing an indication whether a LFNST transform set is to be used in decoding the encoded video block.

In operation 408, responsive to the value of the MTS index not being the predetermined value, the processing circuitry 301 of the decoder 110 may infer the LFNST index to be a specific value (i.e., a default value) and set the value of the LFNST index to the default value.

In operation 410, the processing circuitry 301 may decode the encoded video block based on the value of the MTS index and the value of the LFNST index.

The processing circuitry 301 may perform operations 400-410 for other encoded video blocks in the bit stream.

Figure 5:
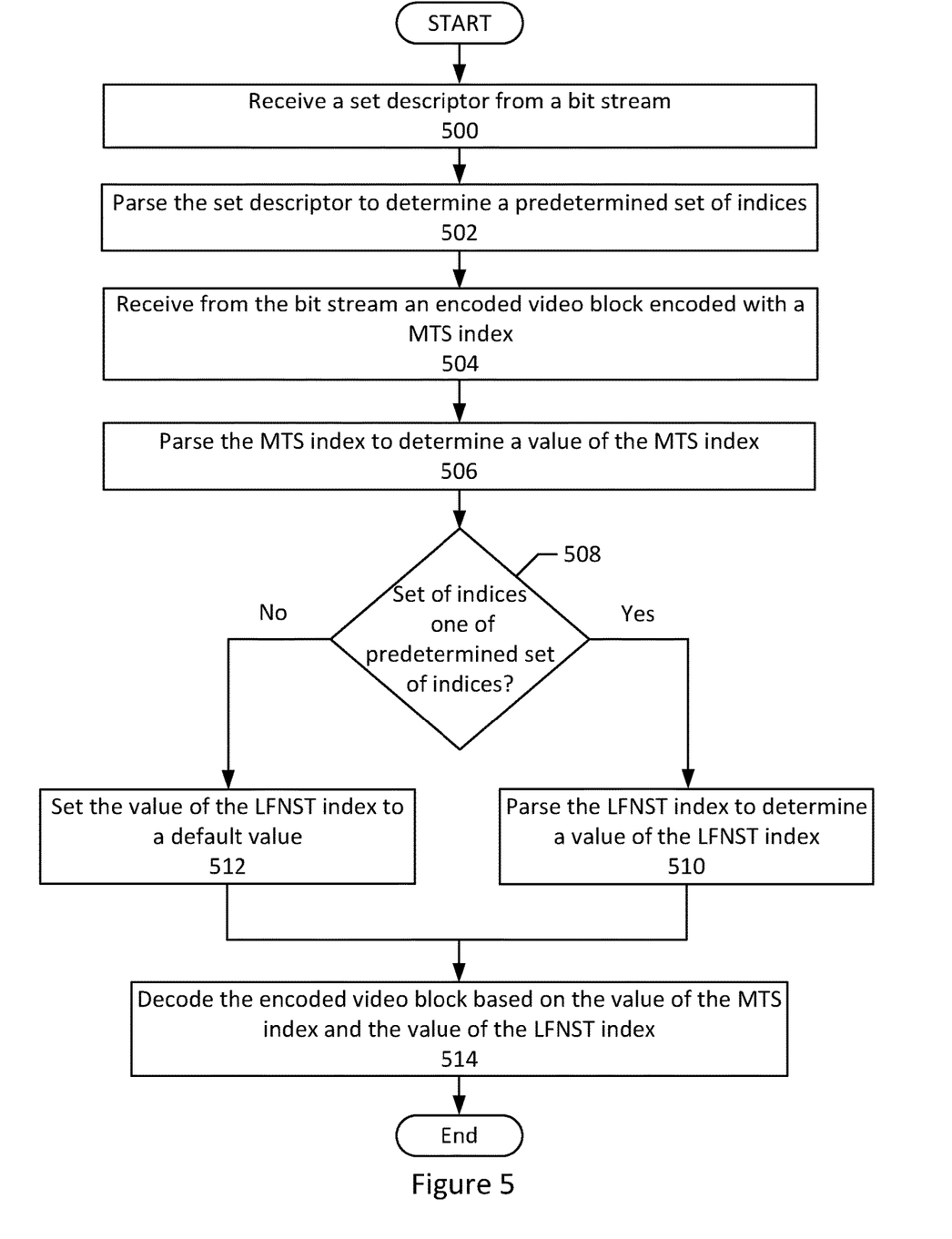

FIG. 5 illustrates another embodiment of decoder operations. Turning to FIG. 5, in operation 500, the processing circuitry 301 may receive a set descriptor from a bit stream. The set descriptor may be received only once per frame. In another variant, the set descriptor may be received only once per sequence. In yet another variant, the set descriptor may be received once per CTU, or once per CU. In operation 502, the processing circuitry 301 may parse the set descriptor to determine a predetermined set of indices.

In operation 504, the processing circuitry 301 may, via network interface 305, receive from the bit stream, an encoded video block encoded with a multiple transform selection, MTS, index. In operation 506, the processing circuitry 301 may parse the MTS index to determine a value of the MTS index, the value identifying a set of indices. In operation 508, the processing circuitry 301 may determine whether the value is one of a predetermined set of indices.

Responsive to the value being one of the predetermined set of indices, the processing circuitry in operation 510 may parse a low frequency non-separable transform, LFNST, index from the bit stream to determine a value of the LFNST index, the value indicating whether a LFNST transform set is to be used in decoding the encoded video block.

Responsive to the value not being one of the predetermined set of indices, the processing circuitry 301 in operation 512 may infer the LFNST index to be a specific value and set the LFNST to the specific value (i.e., a default value) indicating no LFNST transform is to be used in decoding the encoded video block.

In operation 514, the processing circuitry 301 may decode the encoded video block based on the value of the MTS index and the value of the LFNST index.

In one embodiment, the predetermined set of MTS indices may be the set consisting of only index 0: set={0}. If the MTS index does not belong to this set, the decoder may infer the LFNST index to be the specific value (e.g., a value of 0). If the set of indices is one of the predetermined set of MTS indices (e.g., DCT-2, DCT-2), the decoder will parse the LFNST index from the bit stream.

In another embodiment, the predetermined set of MTS indices is the set consisting of indices 0 and 1: set={0,1}. Thus, if the set of MTS indices does not belong to this set, the decoder may infer the LFNST index to be the specific value 0. If the set of MTS indices does belong to this set, which means either the combination (DCT-2, DCT-2) or the combination (DST-7, DST-7), the decoder will parse the LFNST index from the bit stream.

In another embodiment, the predetermined set of MTS indices is the set consisting of indices 0, 1, and 2: set={0,1, 2}. Thus, if the set of MTS indices does not belong to the predetermined set of indices, the decoder may infer the LFNST index to be the specific value 0. If the set of MTS indices does belong to the predetermined set of indices, the decoder will parse the LFNST index from the bit stream.

In a further embodiment, a different set of LFNST transforms may be used for each set of indices. For example, the LFNST transforms of Table 1 may be used for the combination (DCT-2, DCT-2). A first set of LFNST transforms different from the LFNST transforms of Table 1 may be used for the combination of (DST-7, DST-7). A second set of LFNST transforms different from the LFNST transforms of Table 1 and the first set of LFNST transforms may be used for the combination of (DCT-8, DST-7). A third set of LFNST transforms different from the LFNST transforms of Table 1 and the first set and second set of LFNST transforms may be used for the combination of (DST-7, DCT-8). A fourth set of LFNST transforms different from the LFNST transforms of Table 1 and the first, second, and third sets of LFNST transforms may be used for the combination of (DCT-8, DCT-8).

As indicated above in operation 500, the decoder may parse a set descriptor. In one embodiment of operation 500, the decoder parses the set descriptor according to the following table:

| Set descriptor binarization | Set descriptor index | Determined set |
| --- | --- | --- |
| 0 | 0 | {0} |
| 10 | 1 | {0, 1} |
| 110 | 2 | {0, 1, 2} |
| 1110 | 3 | {0, 1, 2, 3} |
| 1111 | 4 | {0, 1, 2, 3, 4} |

As an example, when the decoder obtains the bits 110 for the set descriptor, this means that the set descriptor index is 2, and that the determined set of MTS indices is {0, 1, 2}. When the decoder parses the MTS index, if the index is 0, 1 or 2 (i.e., it belongs to the set), the LFNST index will be parsed. Otherwise it will be inferred to zero.

The determined set in the above table may be different in other embodiments. For example, the determined set for set descriptor 1 may be {0}, {1}, {2}, {3}, {4}, {0, 2} or {0, 3} or {0, 4} or {1, 2} or {1, 3} or {1, 4} or {0, 1, 2} or any other combination of sets. The determined set for set descriptors 0, 2, 3, and 4 may also be any other combination of sets.

Various operations from the flow chart of FIG. 5 may be optional with respect to some embodiments of wireless devices and related methods. Regarding methods of example embodiment 5 (set forth below), for example, operations of blocks 500 and 502 of FIG. 5 may be optional.

The processing circuitry 301 may perform operations 500-514 for other encoded video blocks in the bit stream.

The below embodiments describe operations from an encoder perspective. These embodiments will be described using the flowcharts in FIGS. 6 and 7.

Figure 6:
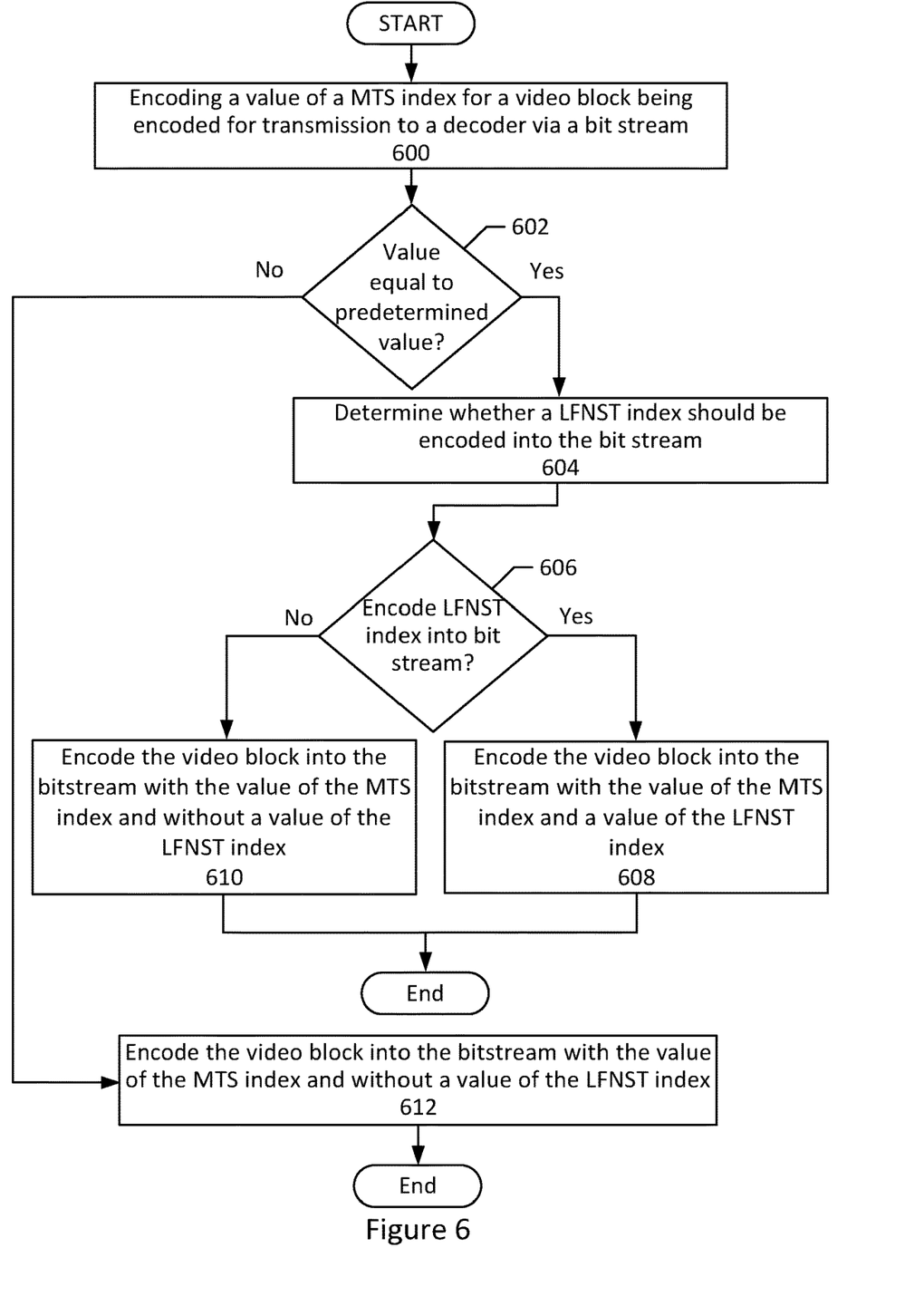
FIGS. 6-7 are flow charts illustrating operations of an encoder in accordance with some embodiments of inventive concepts.

Turning to FIG. 6, in operation 600, the processing circuitry 201 of encoder 100 may encode a value of a multiple transform selection, MTS, index for a video block being encoded for transmission to a decoder via a bit stream. Based on the value of the MTS index, it will decide whether or not to encode the LFNST index.

Based on the value of the MTS index being a predetermined value (in operation 602), the processing circuitry 201 in operation 604 may determine whether a low frequency non-separable transform (LFNST) index should be encoded into the bit stream.

Responsive to determining in operation 606 that the LFNST index should be encoded into the bit stream, in operation 608, the processing circuitry 201 may encode the video block into the bitstream with the value of the MTS index and a value of the LFNST index, the value of the LFNST index based on the value of the MTS index Responsive to determining in operation 606 that the LFNST index should not be encoded into the bit stream, in operation 610, the processing circuitry 201 may encode the video block into the bitstream with the value of the MTS index without encoding a value of the LFNST index into the bit stream. In other words, the encoder 100 will not encode the LFNST index into the bit stream.

Based on the value of the MTS index being a predetermined value (in operation 602), the processing circuitry 201 in operation 612 may encode the video block into the bitstream with the value of the MTS index without encoding a value of the LFNST index into the bit stream.

In one embodiment, the predetermined value (for the MTS index) is 0.

The processing circuitry 201 may perform operations 600-610 for other video blocks being encoded.

Figure 7:
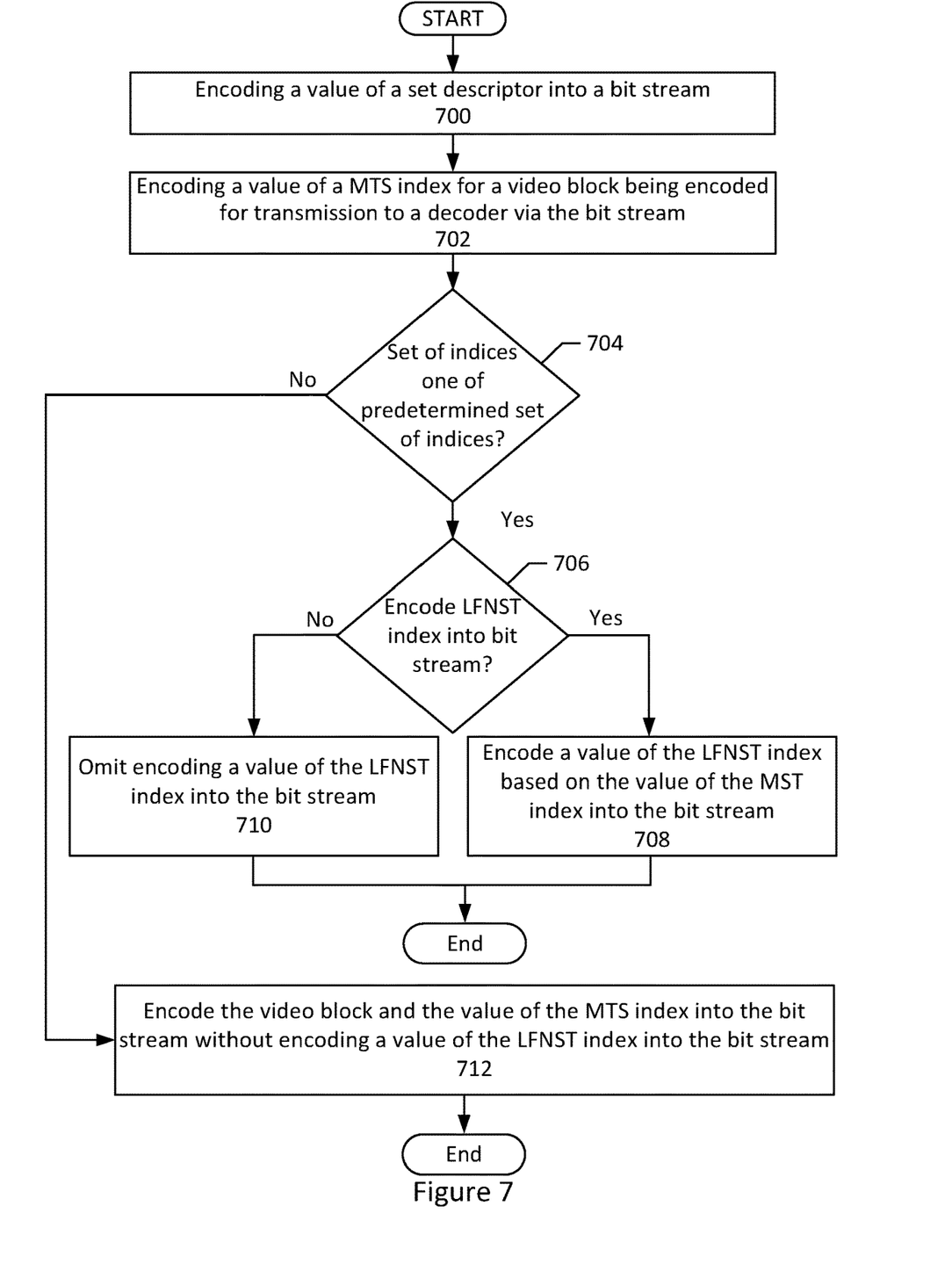

Turning to FIG. 7, in another embodiment, the processing circuitry 201 of encoder 100 in operation 700 may encode a set descriptor into the bit stream, wherein the set descriptor indicates indices that are in a predetermined set of indices. The processing circuitry 201 may encode the set descriptor only once per frame. In another variant, the processing circuitry 201 may encode the set descriptor only once per sequence. In yet another variant, the processing circuitry 201 may encode the set descriptor once per CTU, or once per CU.

In operation 702, the processing circuitry 201 may encode a value of a multiple transform selection, MTS, index for a video block being encoded for transmission to a decoder via a bit stream, the value identifying a set of indices.

Based on a predetermined set of MTS indices, the processing circuitry 201 decides whether to encode the LFNST index or not.

Responsive to the set of indices being one of a predetermined set of indices (operation 704), the processing circuitry 201 may determine in operation 706 wherein to encode a value of a low frequency non-separable transform, LFNST, index into the bit stream based on the value of the MTS index.

Response to determining that a value of the LFNST index should be encoded into the bit stream, the processing circuitry 201 in operation 708, may omit encoding the value of the LFNST index into the bit stream.

Response to determining that a value of the LFNST index should not be encoded into the bit stream, the processing circuitry 201 in operation 710, may omit encoding (i.e., not encode) the value of the LFNST index into the bit stream.

Responsive to the set of indices not being one of a predetermined set of indices (operation 704), the processing circuitry 201 may encode the video block and the value of the MTS index in operation 712 without encoding a value of the LFNST index into the bitstream.

In one embodiment, the predetermined set of MTS indices is the set consisting of only index 0: set={0}. Thus, when the MTS index does not belong to the predetermined set of MTS indices, the encoder may omit the LFNST index in the bit stream. When the MTS index does belong to the predetermined set of MTS indices, the encoder may encode the LFNST index into the bit stream.

In another embodiment, the predetermined set of MTS indices is the set consisting of indices 0 and 1: set={0,1}. Thus, when the MTS index does not belong to the predetermined set of MTS indices, the encoder may omit encoding the LFNST index into the bit stream. When the MTS index does belong to the predetermined set of MTS indices, which means that it uses either the combination (DCT-2, DCT-2) or the combination (DST-7, DST-7), the encoder may encode the LFNST index into the bit stream.

In another embodiment, the predetermined set of MTS indices is the set consisting of indices 0, 1, and 2: set={0,1, 2}. Thus, when the MTS index does not belong to the predetermined set of MTS indices, the encoder may omit encoding the LFNST index into the bit stream. When the MTS index does belong to the predetermined set of MTS indices, the encoder may encode the LFNST index into the bit stream.

In a further embodiment, a different set of LFNST transforms may be used for each set of indices. For example, the LFNST transforms of Table 1 may be used for the combination (DCT-2, DCT-2). A first set of LFNST transforms different from the LFNST transforms of Table 1 may be used for the combination of (DST-7, DST-7). A second set of LFNST transforms different from the LFNST transforms of Table 1 and the first set of LFNST transforms may be used for the combination of (DCT-8, DST-7). A third set of LFNST transforms different from the LFNST transforms of Table 1 and the first set and second set of LFNST transforms may be used for the combination of (DST-7, DCT-8). A fourth set of LFNST transforms different from the LFNST transforms of Table 1 and the first, second, and third sets of LFNST transforms may be used for the combination of (DCT-8, DCT-8).

In another embodiment, the encoder may first encode a set descriptor. Based on the set descriptor, a set of MTS indices is determined. The encoder may then encode the MTS index. Based on the determined set of MTS indices, the encode may determine whether to omit the LFNST index or not.

If the value of the MTS index does not belong to the determined set of MTS indices, the encoder may omit the LFNST index in the bit stream.

If the value of the MTS index does belong to the determined set of MTS indices, the encoder may encode the LFNST index into the bit stream.

In an example of this embodiment, the encoder encodes the set descriptor according to the following table:

| Set descriptor binarization | Set descriptor index | Determined set |
| --- | --- | --- |
| 0 | 0 | {0} |
| 10 | 1 | {0, 1} |
| 110 | 2 | {0, 1, 2} |
| 1110 | 3 | {0, 1, 2, 3} |
| 1111 | 4 | {0, 1, 2, 3, 4} |

As an example, if the encoder writes (i.e., encodes) the bits 110 for the set descriptor, it means that the set descriptor index is 2, and that the determined set of MTS indices is {0, 1, 2}. Later, when the encoder writes the MTS index, if the index is 0, 1 or 2 (i.e., it belongs to the set), the LFNST index will be encoded. Otherwise it will be omitted.

In one variant of this embodiment, the set descriptor is encoded only once per frame. In another variant, it is encoded only once per sequence. In yet another variant of this embodiment, the set descriptor is encoded once per CTU, or once per CU.

The determined set in the above table may be different in other embodiments. For example, the determined set for set descriptor 1 may be {0}, {1}, {2}, {3}, {4}, {0, 2} or {0, 3} or {0, 4} or {1, 2} or {1, 3} or {1, 4} or {0, 1, 2} or any other combination of sets. The determined set for set descriptors 0, 2, 3, and 4 may also be any other combination of sets.

Various operations from the flow chart of FIG. 7 may be optional with respect to some embodiments of wireless devices and related methods. Regarding methods of example embodiment 20 (set forth below), for example, operations of block 700 of FIG. 7 may be optional.

The processing circuitry 201 may perform operations 700-710 for other video blocks being encoded.

LISTING OF EMBODIMENTS

Embodiment 1

A method performed by a decoder, the method comprising:
  receiving (400) a bit stream having an encoded video block encoded with a multiple transform selection, MTS, index;
  parsing (402) the MTS index to determine a value of the MTS index;
  responsive (404) to the value of the MTS index being a predetermined value:
    parsing (406) a low frequency non-separable transform, LFNST, index from the bit stream to determine a value of the LFNST index, the value of the LFNST index providing an indication whether a LFNST transform set is to be used in decoding the encoded video block; and
  responsive (404) to the value of the MTS index not being the predetermined value:
    setting (408) the value of the LFNST index to a default value indicating no LFNST transform is to be used in decoding the encoded video block; and
  decoding (410) the encoded video block based on the value of the MTS index and the value of the LFNST index.

Embodiment 2

The method of Embodiment 1 wherein the predetermined value of the MTS index is 0.

Embodiment 3

The method of any of Embodiments 1-2 wherein the default value of the LFNST index is 0.

Embodiment 4

The method of any of Embodiments 1-3 wherein the value of the MTS index identifies a set of indices and the predetermined value identifies a predetermined set of indices.

Embodiment 5

A method performed by a decoder, the method comprising:
  receiving (504) a bit stream having an encoded video block encoded with a multiple transform selection, MTS, index;
  parsing (506) the MTS index to determine a value of the MTS index, the value identifying a set of indices;
  determining (508) whether the set of indices is one of a predetermined set of indices;
  responsive to the set of indices being one of the predetermined set of indices:
    parsing (510) a low frequency non-separable transform, LFNST, index from the bit stream to determine a value of the LFNST index, the value indicating whether a LFNST transform set is to be used in decoding the encoded video block; and
  responsive to the set of indices not being one of the predetermined set of indices:
    setting (512) the value of the LFNST index to a default value indicating no LFNST transform is to be used in decoding the encoded video block; and
  decoding (514) the encoded video block based on the value of the MTS index and the value of the LFNST index.

Embodiment 6

The method of Embodiment 5 wherein the predetermined set of indices comprises a set comprising only index 0.

Embodiment 7

The method of Embodiment 5 wherein the predetermined set of indices comprises a set comprising only index 0 and index 1.

Embodiment 8

The method of Embodiment 5 wherein the predetermined set of indices comprises a set comprising only index 0, index 1, and index 2.

Embodiment 9

The method of any of Embodiments 5-8 further comprising:
  receiving (500) a set descriptor from the bit stream;
  parsing (502) the set descriptor to determine the predetermined set of indices;

Embodiment 10

The method of Embodiment 9 wherein receiving the set descriptor comprises receiving the set descriptor once per frame.

Embodiment 11

The method of Embodiment 9 wherein receiving the set descriptor comprises receiving the set descriptor once per sequence of frames.

Embodiment 12

The method of Embodiment 9 wherein receiving the set descriptor comprises receiving the set descriptor once per coding tree unit.

Embodiment 13

The method of Embodiment 9 wherein receiving the set descriptor comprises receiving the set descriptor once per coding unit.

Embodiment 14

A decoder (110) comprising:
a processor (301); and
memory (303) coupled with the processor, wherein the memory comprises instructions that when executed by the processor cause the decoder to perform operations according to any of Embodiments 1-13.

Embodiment 15

The decoder of Embodiment 14 wherein the processor performs the operations.

Embodiment 16

A decoder (110) configured to perform according to any of Embodiments 1-13.

Embodiment 17

A computer program comprising computer-executable instructions configured to cause a device to perform the method according to any one of Embodiments 1-13, when the computer-executable instructions are executed on a processor (301) comprised in a device.

Embodiment 18

A computer program product comprising a non-transitory computer-readable storage medium (303), the computer-readable storage medium having computer-executable instructions configured to cause a device to perform the method according to any one of Embodiments 1-13 when the computer-executable instructions are executed on a processor (301) comprised in a device.

Embodiment 19

A method performed by an encoder, the method comprising:
encoding (600) a value of a multiple transform selection, MTS, index for a video block being encoded for transmission to a decoder via a bit stream;
based on the value of the MTS index being a predetermined value (602), determining (604) whether a low frequency non-separable transform, LFNST, index should be encoded into the bit stream;
responsive to determining (606) that the LFNST index should be encoded into the bitstream:
encoding (608) the video block into the bitstream with the value of the MTS index and a value of the LFNST index, the value of the LFNST index based on the value of the MTS index; and
responsive to determining (606) that the LFNST index should not be encoded into the bit stream:
encoding (610) the video block into the bitstream with the value of the MTS index without encoding a value of the LFNST index into the bit stream; and
based on the value of the MTS index not being a predetermined value (602):
encoding (612) the video block into the bitstream with the value of the MTS index without encoding a value of the LFNST index into the bit stream.

Embodiment 20

The method of Embodiment 19 wherein the predetermined value is 0.

Embodiment 21

A method performed by an encoder, the method comprising:
encoding (702) a value of a multiple transform selection, MTS, index for a video block being encoded for transmission to a decoder via a bit stream, the value identifying a set of indices;
responsive to the set of indices being one of a predetermined set of indices (704):
determining (706) whether a low frequency non-separable transform, LFNST, index should be encoded into the bit stream based on the value of the MTX index;
responsive to determining (706) that the LFNST index should be encoded into the bitstream:
encoding (708) the video block into the bitstream with the value of the MTS index and a value of the LFNST index, the value of the LFNST index based on the value of the MTS index; and
responsive to determining (706) that the LFNST index should not be encoded into the bit stream:
encoding (710) the video block into the bitstream with the value of the MTS index without encoding a value of the LFNST index into the bit stream; and
responsive to the set of indices not being one of a predetermined set of indices (704):
encoding (712) the video block and the value of the MTS index into the bit stream without encoding a value of the LFNST index into the bit stream.

Embodiment 22

The method of Embodiment 21 wherein the predetermined set of indices comprises a set comprising only index 0.

Embodiment 23

The method of Embodiment 21 wherein the predetermined set of indices comprises a set comprising only index 0 and index 1.

Embodiment 24

The method of Embodiment 21 wherein the predetermined set of indices comprises a set comprising only index 0, index 1, and index 2.

Embodiment 25

The method of any of Embodiments 21-23 further comprising:
encoding (700) a set descriptor into the bit stream, wherein the set descriptor indicates indices that are in the predetermined set of indices.

Embodiment 26

The method of Embodiment 25 wherein encoding the set descriptor comprises encoding the set descriptor once per frame.

Embodiment 27

The method of Embodiment 25 wherein encoding the set descriptor comprises encoding the set descriptor once per sequence of frames.

Embodiment 28

The method of Embodiment 25 wherein encoding the set descriptor comprises encoding the set descriptor once per coding tree unit.

Embodiment 29

The method of Embodiment 25 wherein receiving the set descriptor comprises receiving the set descriptor once per coding unit.

Embodiment 30

An encoder (100) comprising:
a processor (201); and
memory (203) coupled with the processor, wherein the memory comprises instructions that when executed by the processor cause the encoder to perform operations according to any of Embodiments 19-29.

Embodiment 31

The encoder of Embodiment 30 wherein the processor performs the operations.

Embodiment 32

An encoder (100) configured to perform according to any of Embodiments 19-29.

Embodiment 33

A computer program comprising computer-executable instructions configured to cause a device to perform the method according to any one of Embodiments 19-29, when the computer-executable instructions are executed on a processor (201) comprised in a device.

Embodiment 34

A computer program product comprising a non-transitory computer-readable storage medium (203), the computer-readable storage medium having computer-executable instructions configured to cause a device to perform the method according to any one of Embodiments 19-29 when the computer-executable instructions are executed on a processor (201) comprised in a device.

Explanations for abbreviations from the above disclosure are provided below.

| Abbreviation | Explanation |
| --- | --- |
| CTC | Common Test Conditions |
| DCT | Discrete Cosine Transformation |
| DST | Discrete Sine Transformation |
| JVET | Joint Video Expert Team |
| LFNST | Low Frequency Non-Separable Transform |
| MTS | Multiple Transform Selection |
| VTM | VVC Test Model |
| VVC | Versatile Video Coding |

Citations for references from the above disclosure are provided below.
1. M. Koo, J. Lim, M. Salehifar, S. H. Kim. CE6: Reduced Secondary Transform (RST) (CE6-3.1), JVET-N0193, Geneva, March 2019, http://phenix.it-udparis.eu/jvet/doc_end_user/current_document.php?id=5913

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a decoder, the method comprising:
receiving a bit stream having an encoded video block encoded with a multiple transform selection, MTS, index;
receiving a set descriptor from the bit stream once per frame, once per sequence of frames, once per coding tree unit, or once per coding unit;
parsing the set descriptor to determine a predetermined set of indices;
parsing the MTS index to determine a value of the MTS index;

determining whether the value is one of the predetermined set of indices;
responsive to the value being one of the predetermined set of indices:
parsing a low frequency non-separable transform, LFNST, index from the bit stream to determine a value of the LFNST index, the value indicating whether a LFNST transform set is to be used in decoding the encoded video block; and
responsive to the value not being one of the predetermined set of indices:
setting the value of the LFNST index to a default value indicating no LFNST transform is to be used in decoding the encoded video block; and
decoding the encoded video block based on the value of the MTS index and the value of the LFNST index.

2. The method of claim 1 wherein the predetermined set of indices comprises at least one of:
a set comprising only index 0;
a set comprising only index 0 and index 1; and
a set comprising only index 0, index 1, and index 2.

3. A computer program product comprising a non-transitory computer-readable storage medium, the computer-readable storage medium having computer-executable instructions configured to cause a device to perform the method according to claim 1 when the computer-executable instructions are executed on a processor comprised in a device.

4. The method of claim 1 wherein the default value of the LFNST index is 0.

5. A decoder comprising:
a processor; and
memory coupled with the processor, wherein the memory comprises instructions that when executed by the processor cause the decoder to perform operations comprising:
receiving a bit stream having an encoded video block encoded with a multiple transform selection, MTS, index;
receiving a set descriptor from the bit stream once per frame, once per sequence of frames, once per coding tree unit, or once per coding unit;
parsing the set descriptor to determine a predetermined set of indices;
parsing the MTS index to determine a value of the MTS index;
determining whether the value is one of a predetermined set of indices;
responsive to the value being one of the predetermined set of indices:
parsing a low frequency non-separable transform, LFNST, index from the bit stream to determine a value of the LFNST index, the value indicating whether a LFNST transform set is to be used in decoding the encoded video block; and
responsive to the value not being one of the predetermined set of indices:
setting the value of the LFNST index to a default value indicating no LFNST transform is to be used in decoding the encoded video block; and
decoding the encoded video block based on the value of the MTS index and the value of the LFNST index.

6. The decoder of claim 5 wherein the predetermined set of indices comprises at least one of:
a set comprising only index 0;
a set comprising only index 0 and index 1; and
a set comprising only index 0, index 1, and index 2.

7. A method performed by an encoder, the method comprising:
encoding a value of a multiple transform selection, MTS, index for a video block being encoded for transmission to a decoder via a bit stream;
encoding a set descriptor into the bit stream once per frame, once per sequence of frames, once per coding tree unit, or once per coding unit, wherein the set descriptor indicates indices that are in the predetermined set of indices;
responsive to the value being one of a predetermined set of indices:
determining whether a low frequency non-separable transform, LFNST, index should be encoded into the bit stream based on the value of the MTS index;
responsive to determining that the LFNST index should be encoded into the bitstream:
encoding the video block into the bitstream with the value of the MTS index and a value of the LFNST index, the value of the LFNST index based on the value of the MTS index; and
responsive to determining that the LFNST index should not be encoded into the bit stream:
encoding the video block into the bitstream with the value of the MTS index without encoding a value of the LFNST index into the bit stream; and
responsive to the value not being one of a predetermined set of indices:
encoding the video block and the value of the MTS index into the bit stream without encoding a value of the LFNST index into the bit stream.

8. The method of claim 7 wherein the predetermined set of indices comprises at least one of:
a set comprising only index 0;
a set comprising only index 0 and index 1; and
a set comprising only index 0, index 1, and index 2.

9. A computer program product comprising a non-transitory computer-readable storage medium, the computer-readable storage medium having computer-executable instructions configured to cause a device to perform the method according to claim 7 when the computer-executable instructions are executed on a processor comprised in a device.

10. An encoder comprising:
a processor; and
memory coupled with the processor, wherein the memory comprises instructions that when executed by the processor cause the encoder to perform operations comprising:
encoding a value of a multiple transform selection, MTS, index for a video block being encoded for transmission to a decoder via a bit stream;
encoding a set descriptor into the bit stream once per frame, once per sequence of frames, once per coding tree unit, or once per coding unit, wherein the set descriptor indicates indices that are in the predetermined set of indices;
responsive to the value being one of a predetermined set of indices:
determining whether a low frequency non-separable transform, LFNST, index should be encoded into the bit stream based on the value of the MTS index;
responsive to determining that the LFNST index should be encoded into the bitstream:
encoding the video block into the bitstream with the value of the MTS index and a value of the LFNST index, the value of the LFNST index based on the value of the MTS index; and responsive to determining that the LFNST index should not be encoded into the bit stream:

encoding the video block into the bitstream with the value of the MTS index without encoding a value of the LFNST index into the bit stream; and responsive to the value not being one of a predetermined set of indices:

encoding the video block and the value of the MTS index into the bit stream without encoding a value of the LFNST index into the bit stream.

11. The encoder of claim 10 wherein the predetermined set of indices comprises at least one of:

a set comprising only index 0;

a set comprising only index 0 and index 1;

a set comprising only index 0, index 1, and index 2.

* * * * *